United States Patent
Budinger et al.

(10) Patent No.: US 7,279,229 B2
(45) Date of Patent: Oct. 9, 2007

(54) NICKEL-BASE BRAZE MATERIAL AND METHOD OF FILLING HOLES THEREWITH

(75) Inventors: David Edwin Budinger, Loveland, OH (US); Richard Ludwig Schmidt, Marblehead, MA (US); Mark David Veliz, Mason, OH (US); Michael Howard Rucker, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 155 days.

(21) Appl. No.: 10/907,218

(22) Filed: Mar. 24, 2005

(65) Prior Publication Data

US 2006/0216540 A1    Sep. 28, 2006

(51) Int. Cl.
| | |
|---|---|
| B32B 15/02 | (2006.01) |
| B32B 5/16 | (2006.01) |
| B32B 7/02 | (2006.01) |
| B22F 1/00 | (2006.01) |
| B22F 9/00 | (2006.01) |
| B23K 35/22 | (2006.01) |

(52) U.S. Cl. .............. 428/557; 428/553; 428/570; 428/680; 228/248.1

(58) Field of Classification Search ............... None
See application file for complete search history.

(56) References Cited

U.S. PATENT DOCUMENTS

| | | | |
|---|---|---|---|
| 5,232,343 A | 8/1993 | Butts | 416/97 R |
| 5,240,491 A * | 8/1993 | Budinger et al. | 75/255 |
| 5,666,643 A | 9/1997 | Chesnes et al. | 428/549 |
| 6,187,450 B1 | 2/2001 | Budinger et al. | 428/546 |
| 6,190,467 B1 * | 2/2001 | Jackson et al. | 148/426 |
| 6,530,971 B1 | 3/2003 | Cohen et al. | 75/254 |
| 6,679,680 B2 * | 1/2004 | Um et al. | 415/173.1 |
| 6,789,315 B2 * | 9/2004 | Marques et al. | 29/889.1 |

* cited by examiner

*Primary Examiner*—Jennifer McNeil
*Assistant Examiner*—Jason Savage
(74) *Attorney, Agent, or Firm*—David L. Narciso; Gary M. Hartman; Domenica N. S. Hartman

(57) ABSTRACT

A nickel-base braze material suitable for closing holes in a high temperature component, such as a tip cap hole in a turbine blade. The braze material comprises first and second filler materials and a binder. The first filler material comprises particles of a first alloy, and the second filler material comprises particles of at least a second alloy having a lower melting temperature than the first alloy. The second alloy consists essentially of, by weight, about 8 to about 23 percent chromium, about 4 to about 18 percent cobalt, about 1.5 to about 6.0 percent tantalum, about 1.0 to about 6.0 percent aluminum, about 0.3 to about 1.5 percent boron, about 2.0 to about 6.0 percent silicon, up to 0.2 percent carbon, the balance being nickel and incidental impurities.

20 Claims, 6 Drawing Sheets

R80+D15M2

R80+D15M2

R80+D15M2+GE81

R142+D15M2+D15

R142+[D15M2+D15]

R195+D15M2

NICKEL-BASE BRAZE MATERIAL AND METHOD OF FILLING HOLES THEREWITH

STATEMENT REGARDING FEDERALLY SPONSORED RESEARCH

This invention was made with Government support under Agreement No. N00019-99-C-1175 awarded by the Navy. The Government has certain rights in the invention.

BACKGROUND OF THE INVENTION

The present invention relates to brazing materials for components that operate at high temperatures. More particularly, this invention relates to nickel-base braze alloys that exhibit sufficient strength and oxidation and creep resistance for use as a filler material for holes in a turbine blade, such as holes in high pressure turbine blade tip caps.

Components of gas turbine engines, such as blades (buckets), vanes (nozzles) and combustors, are typically formed of nickel, cobalt or iron-base superalloys with desirable mechanical properties for turbine operating temperatures and conditions. Because the efficiency of a gas turbine engine is dependent on its operating temperatures, there is a demand for components, and particularly turbine blades and vanes, that are capable of withstanding increasingly higher temperatures. As the maximum local metal temperature of a superalloy component approaches the melting temperature of the superalloy, forced air cooling becomes necessary. For this reason, airfoils of gas turbine engine blades and vanes often require a complex cooling scheme in which bleed air from the engine compressor is forced through internal cooling passages within the airfoil and then discharged through cooling holes at the airfoil surface. Considerable cooling air is often required to sufficiently lower the surface temperature of a blade or vane.

Blades and vanes formed by casting processes require cores to define the internal cooling passages. During the manufacture of high pressure turbine blades of the type as disclosed in commonly-assigned U.S. Pat. No. 5,232,343, holes in the blade tip cap are required to locate the cores. Before engine installation, these holes, which may have diameters of, for example, about 0.030 to 0.040 inch (about 0.76 to 1.02 mm), must be securely closed to prevent the loss of cooling air through the tip cap. As represented in FIG. 1 and reported in commonly-assigned U.S. Pat. No. 6,187,450 to Budinger et al., an existing technique is to fill a tip cap hole 10 by injecting a slurry 12 containing a mixture of particles 14 and 16 of two different alloys, one of which (e.g., 16) has a lower melting point. Budinger et al. reports the higher melting alloy as constituting about 45 weight percent of the particulate mixture, with the balance being the lower melting alloy. Budinger et al. also describe the higher melting alloy as containing (by weight) about 0.15-0.19% carbon, about 13.7-14.3% chromium, about 9.0-10.0% cobalt, about 4.8-5.2% titanium, about 2.8-3.2% aluminum, about 3.7-4.3% tungsten, about 3.7-4.3% molybdenum (7.7% minimum tungsten+molybdenum), the balance nickel and incidental impurities, which is similar to the superalloy known as René 80. (As used herein, incidental impurities are those elements that may be difficult to completely eliminate from an alloy due to processing limitations, yet are not present in sufficient quantities to significantly alter or degrade the desired properties of the alloy.) The lower melting alloy is reported as containing (by weight) 0.05% maximum carbon, about 14.8-15.8% chromium, about 9.5-11.0% cobalt, about 3.0-3.8% tantalum, about 3.2-3.7% aluminum, about 2.1-2.5% boron, the balance nickel and incidental impurities. During brazing, only the lower melting particles 16 are melted, forming a liquid that fills voids between the higher melting particles 14 and, on solidification, bonds the high melting particles 14 together within the tip cap hole 10 and to the substrate material 18 surrounding the hole 10. The resulting brazement 20 is represented in FIG. 2.

Budinger et al. teach that filling a tip cap hole by injection of a slurry containing a mixture of higher and lower melting particles can lead to incomplete filling and a high internal porosity level (as depicted in FIG. 2) that increases susceptibility to oxidation. More generally, there tends to be a tradeoff between oxidation behavior and mechanical properties, in that braze compositions suitable for filling tip cap holes often achieve improved mechanical properties at the expense of oxidation resistance, and vice versa. Braze compositions with low oxidation resistance oxidize away during service, while those with insufficient mechanical properties tend to be ejected from the hole. In both instances, the effect is to re-open the holes during service.

As a solution, Budinger et al. teach filling a tip cap hole 10 with a first slurry 22 containing particles 24 of a relatively high melting point alloy, and then covering the hole 10 and the first slurry 22 therein with a second slurry 23 containing particles 26 of a lower melting point alloy, as represented in FIG. 3. When heated to a temperature above the melting temperature of the lower melting particles 26 but below the melting temperature of the higher melting particles 24, the molten lower melting alloy completely infiltrates the higher melting particles 24 within the hole 10 so that, on solidification, the filling formed by the lower melting particles 26 bonds the high melting particles 24 within the tip cap hole 10, yielding the brazement 30 depicted in FIG. 4. Budinger et al. disclose a suitable higher melting alloy as containing (by weight) about 11.45-12.05% cobalt, 6.6-7.0% chromium, 5.94-6.3% aluminum, 1.3-1.7% molybdenum, 4.7-5.0% tungsten, 6.2-6.5% tantalum, 2.6-3.0% rhenium, 1.3-1.7% hafnium, 0.10-0.14% carbon, up to 0.02% titanium, the balance nickel and incidental impurities (similar to the superalloy known as René 142, U.S. Pat. No. 5,173,255). Budinger et al. disclose two suitable lower melting alloys that exhibit improved capillary flow for yielding a more fully dense structure. A first of the lower melting alloys contains (by weight) 0.13-0.19% carbon, about 13.7-14.3% chromium, about 9.0-10.0% cobalt, about 4.6-5.2% titanium, about 2.8-3.2% aluminum, about 0.5-0.8% boron, about 4.2-4.8% silicon, and the balance nickel and incidental impurities (essentially René 80 modified to contain silicon and have a higher boron content). The second lower melting alloy contains (by weight) 0.01% maximum carbon, about 18.5-19.5% chromium, about 0.03% maximum boron, about 9.8-10.3% silicon, and the balance nickel and incidental impurities. Finally, Budinger et al. disclose that up to fifty weight percent of the lower melting particles 26 in the second slurry 23 can be replaced with particles 24 of the higher melting alloy.

The approach taken by Budinger et al. was to reduce the reliance of boron as the melting point depressant through additions of silicon. It was concluded that, though imparting strength, boron has a negative effect on oxidation resistance. While successfully addressing the concern for incomplete filling of a tip cap hole, the compositions taught by Budinger et al. have been found to be susceptible to oxidation, and in some cases exhibit insufficient mechanical properties, particularly creep rupture life. Therefore, there remains a need for a tip cap hole braze material capable of exhibiting further improvements in environmental resistance and mechanical properties, as well producibility in manufacturing.

BRIEF SUMMARY OF THE INVENTION

The present invention provides a nickel-base braze material suitable for closing holes in a high temperature component, such as tip cap holes in turbine blades. The braze material comprises first and second filler materials and a binder. The first filler material comprises particles of a first alloy, and the second filler material comprises particles of a second alloy having a lower melting temperature than the first alloy. According to the invention, the second alloy consists essentially of, by weight, about 8 to about 23 percent chromium, about 4 to about 18 percent cobalt, about 1.5 to about 6.0 percent tantalum, about 1.0 to about 6.0 percent aluminum, about 0.3 to about 1.5 percent boron, about 2.0 to about 6.0 percent silicon, up to 0.2 percent carbon, the balance being nickel and incidental impurities.

The braze material may be used in a form in which the particles of the first and second alloys are mixed together in the binder to form a mixture of the first and second filler materials, which can then be injected into a hole. Alternatively, the particles of the first and second alloys can be mixed separately with binders to form the first and second filler materials, which can then be injected into a hole such that the first and second filler materials are not mixed together but instead contact each other. If the former, the braze material can be injected into a hole (such as a tip cap hole) to completely fill the hole prior to undergoing a brazing operation, in which the particles of the second alloy melt, the molten second alloy infiltrates the particles of the first alloy, and on cooling the second alloy resolidifies and bonds the particles of the first alloy together within the hole and to the material in which the hole is present. If the first and second filler materials are not mixed together, the first filler material can be injected into a hole (such as a tip cap hole) to completely fill the hole, followed by depositing the second filler material to overlie the first filler material and the surface region surrounding the hole, after which a brazing operation is performed during which the particles of the second alloy melt, the molten second alloy infiltrates the particles of the first alloy within the hole, and on cooling the second alloy resolidifies and bonds the particles of the first alloy together within the hole and to the material in which the hole is present.

According to a preferred aspect of the invention, the second alloy is formulated to promote the ability of the resulting brazement to survive the severe operating environment of a gas turbine engine component, including the oxidation resistance and mechanical properties necessary to remain bonded within a hole. In particular, the second alloy contains relative amounts of boron and silicon that achieve a desirable balance of mechanical and environmental properties, as well as producibility in manufacturing to achieve acceptable yield levels.

Other objects and advantages of this invention will be better appreciated from the following detailed description.

DETAILED DESCRIPTION OF THE INVENTION

Figure 1:
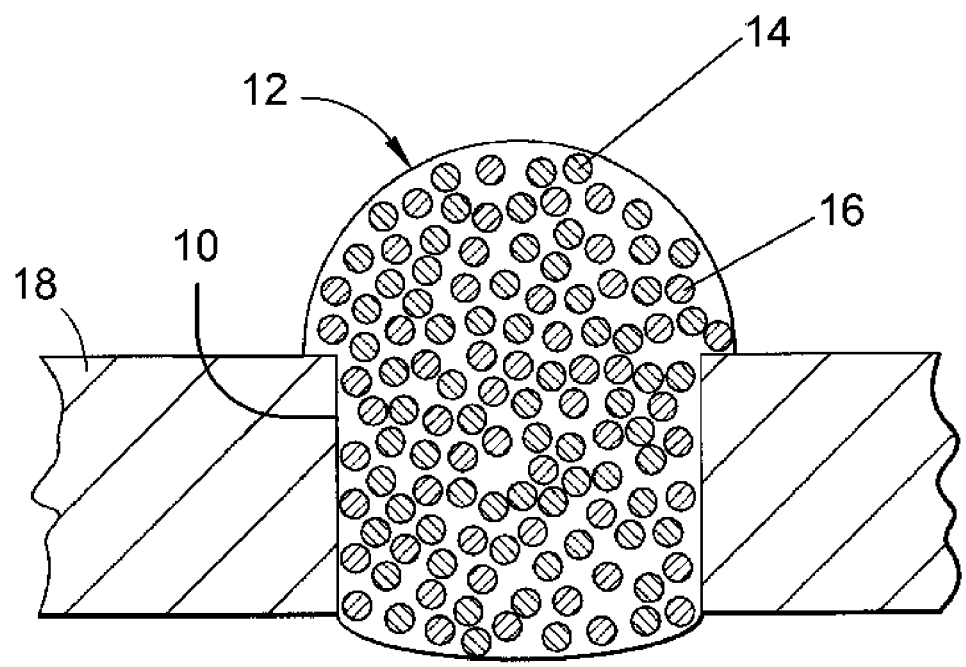
FIG. 1 represents a cross-section through a tip cap hole of a turbine blade, and illustrates a first filling technique suitable for use with the present invention.

The present invention provides a family of braze materials that contain a filler material shown to promote the processing and life of fillings formed with the braze materials. Each of the braze materials contains particles of multiple metal alloys held together by one or more binders. In particular, each braze material contains at least two filler materials, a first of which contains particles of what will be termed a high melting alloy, while the second filler material contains particles of what will be termed a low melting alloy as a result of being capable of fully melting at a temperature at which the high melting alloy is still a solid. In some cases, the second filler material preferably contains additional particles of at least a third alloy having a lower melting temperature that the high melting alloy. In all cases, the lower melting alloy and third alloy are able to melt and infiltrate the particles of the higher melting alloy during a brazing operation, such that on cooling these alloys solidify to bond together the higher melting alloy particles.

The lower melting alloy of this invention (hereinafter D15M2) generally has the following suitable, preferred, and nominal compositions.

TABLE 1

|    | Suitable | Preferred | Nominal |
|----|----------|-----------|---------|
| C  | 0.20 max | 0.05 max  | 0.0     |
| Cr | 8-23     | 14.8-15.8 | 15.3    |
| Co | 4-18     | 9.5-11.0  | 10.25   |
| Ta | 1.5-6.0  | 3.0-3.8   | 3.4     |
| Al | 1.0-6.0  | 3.2-3.7   | 3.45    |
| B  | 0.3-1.5  | 0.8-1.2   | 1.0     |
| Si | 2.0-6.0  | 3.5-4.1   | 3.8     |
| Ni | Balance  | Balance   | 62.7    |

In the preferred range, the D15M2 alloy has an approximate melting temperature of about 2150° F. (about 1180° C.).

Suitable compositions for the high melting alloy are generally the nickel-base superalloys commercially known as René 80, René 142, and René 195. Particular approximate formulations for high melting alloys corresponding to these commercially-known alloys (R80, R142, and R195, respectively) are as follows:

TABLE 2

|    | R80       | R142      | R195      |
|----|-----------|-----------|-----------|
| C  | 0.15-0.19 | 0.10-0.14 | 0.01-0.03 |
| Cr | 13.7-14.3 | 6.6-7.0   | 7.4-7.8   |
| Co | 9.0-10.0  | 11.45-    | 2.9-3.3   |
| Ti | 4.8-5.2   | 0.2 max   | 0         |

TABLE 2-continued

|    | R80       | R142     | R195      |
|----|-----------|----------|-----------|
| Ta | 0         | 6.2-6.5  | 5.3-5.6   |
| Al | 2.8-3.2   | 5.94-6.3 | 7.6-8.0   |
| W  | 3.7-4.3   | 4.7-5.0  | 3.7-4.0   |
| Mo | 3.7-4.3   | 1.3-1.7  | 0         |
| W + Mo | 7.7 min | —      | —         |
| B  | 0         | 0        | 0.01-0.02 |
| Hf | 0         | 1.3-1.7  | 0.12-0.18 |
| Re | 0         | 2.6-3.0  | 1.5-1.8   |
| Si | 0         | 0        | 0.5-0.6   |
| Ni | Balance   | Balance  | Balance   |

The R80, R142, and R195 alloys have approximate melting temperatures of about 2450° F., about 2535° F., and about 2550° F. (about 1340° C., about 1390° C., and about 1400° C.), respectively.

Finally, suitable compositions for additional low melting (third) alloys are two of the three low melting alloys disclosed in U.S. Pat. No. 6,187,450 to Budinger et al., whose approximate compositions are summarized in Table 3 below.

TABLE 3

|    | D15       | GE81      |
|----|-----------|-----------|
| C  | 0.05 max  | 0.01 max  |
| Cr | 14.8-15.8 | 18.5-19.5 |
| Co | 9.5-11.0  | 0         |
| Ta | 3.0-3.8   | 0         |
| Al | 3.2-3.7   | 0         |
| B  | 2.1-2.5   | 0.03 max  |
| Si | 0         | 9.8-10.3  |
| Ni | Balance   | Balance   |

The D15 and GE81 alloys have approximate melting temperatures of about 2170° F. and about 2070° F. (about 1190° C. and about 1130° C.), respectively.

In comparing Tables 1 and 3, it can be seen that the low melting alloy of this invention, D15M2, is based on the low melting alloy identified in Table 3 as D15, the differences being that D15M2 contains an intentional and significant amount of silicon and has a substantially lower boron content than D15. In comparison to the GE81 alloy, the D15M2 alloy contains more boron but far less silicon. D15M2 contains a sufficient but more limited amount of boron to serve as a melting point depressant and improve strength, with minimal negative impact on oxidation resistance in the presence of the silicon content of D15M2. In addition to imparting oxidation resistance, the limited amount of silicon also serves as a melting point depressant. In combination with the above-noted high melting alloys and the optional low melting alloys, the D15M2 alloy has been shown to yield brazements that exhibit significantly better blend of oxidation resistance, strength, and processibility than what was possible using the alloy compositions disclosed in Budinger et al. (namely, high melting alloys R80 and R142 and low melting alloys D15, B93, and GE81).

Preferred braze material compositions based on the above constituents are summarized in Table 4. The High:Low ratio compares suitable relative weights of the high melting alloy and D15M2 (for those compositions containing only D15M2 as the low melting alloy), or the high melting alloy to the combined weight of D15M2 and an additional low melting alloy from Table 3, whichever applies. For those compositions containing an additional alloy from Table 3, the D15M2:Low ratio compares suitable relative weights of D15M2 and the additional alloy. Finally, the High:D15M2 (:Low) ratio compares the preferred relative weights of the high melting alloy, D15M2, and (if present) the additional low melting alloy, respectively.

TABLE 4

| High Melting Alloy | Low Melting Alloy(s) | Suitable Ratios (by weight) High:Low D15M2:Low | Preferred Ratio (by weight) High:D15M2 (:Low) |
|---|---|---|---|
| R195 | D15M2 | 60:40-30:70 | 45:55 |
| R80 | D15M2 | 55:45-25:75 | 40:60 |
| R80 | D15M2 + GE81 | 60:40-30:70 3:1-1:2 | 45:27.5:27.5 |
| R142 | D15M2 + D15 | 60:40-30:70 4:1-1:1 | 45:36.7:18.3 |
| R142 | D15M2 + D15 | 55:45-15:85 4:1-1:1 | 40:40:20 |

Figure 2:
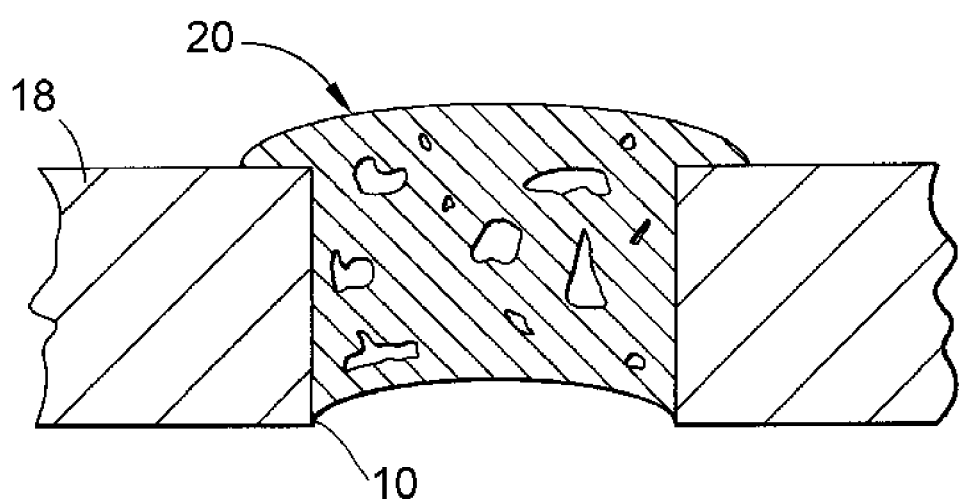
FIG. 2 represents the hole of FIG. 1 after undergoing filling with a filler material of the prior art.
Figure 3:
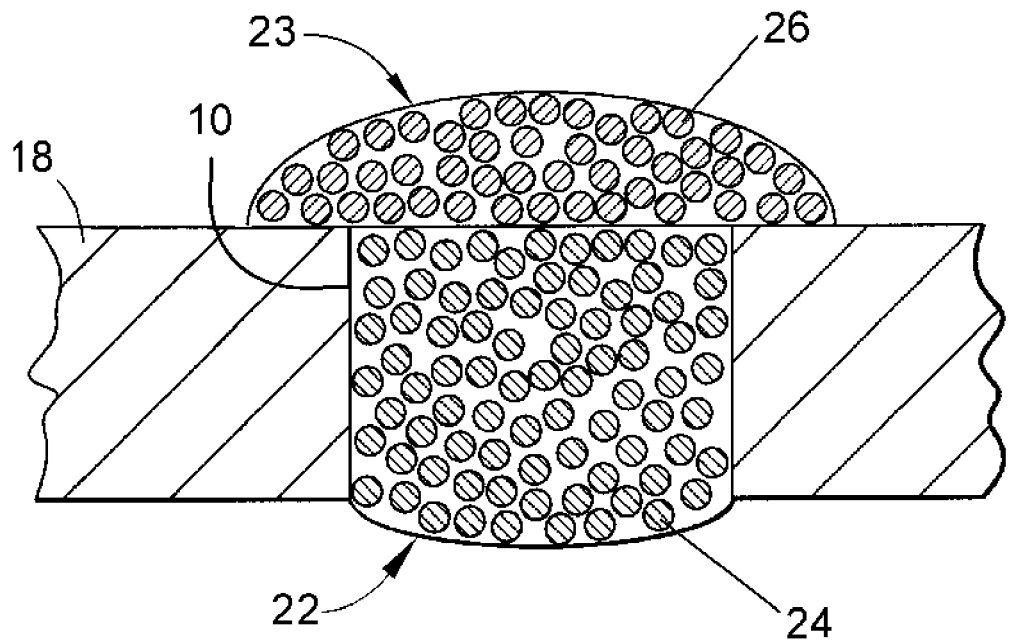
FIG. 3 represents a cross-section through a tip cap hole of a turbine blade, and illustrates a second filling technique suitable for use with the present invention.
Figure 4:
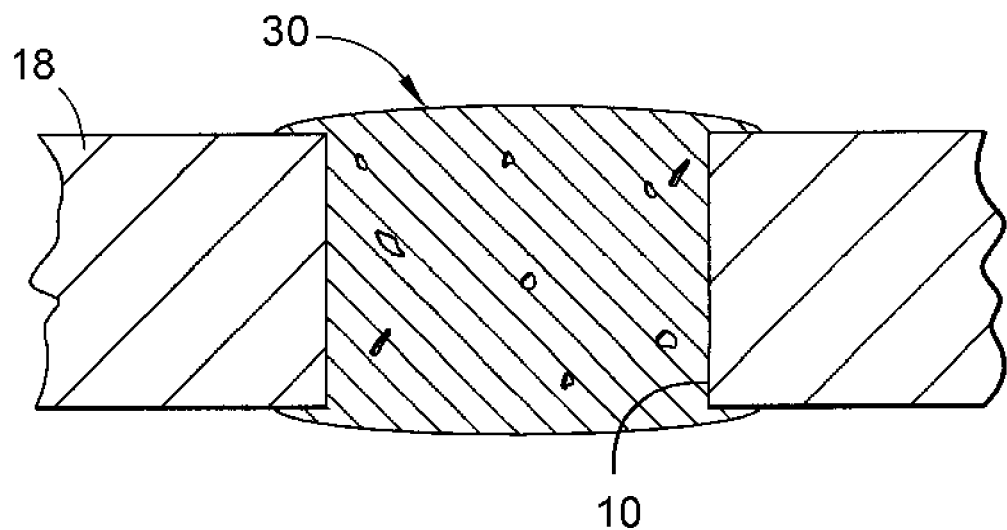
FIG. 4 represents the hole of FIG. 3 after undergoing filling with a filler material of the prior art.
Figure 5:
FIGS. 5 through 9 are scanned images of cross-sections through tip cap holes filled and brazed with braze materials in accordance with the present invention.
Figure 5:
Figure 6:
Figure 6:
Figure 7:
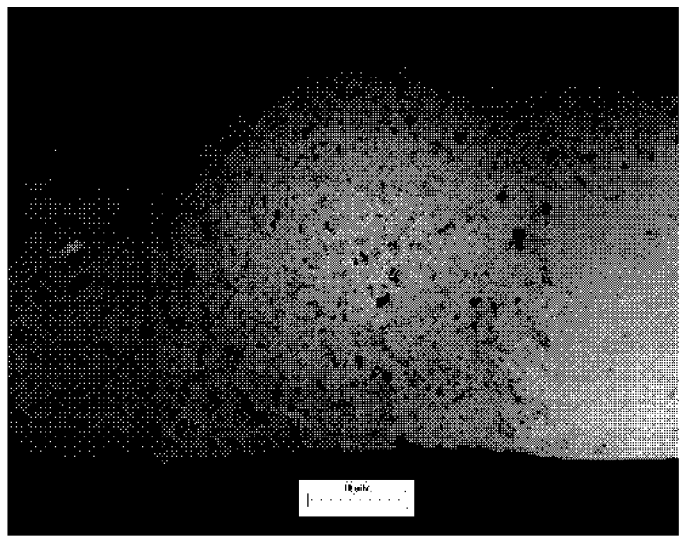
Figure 8:
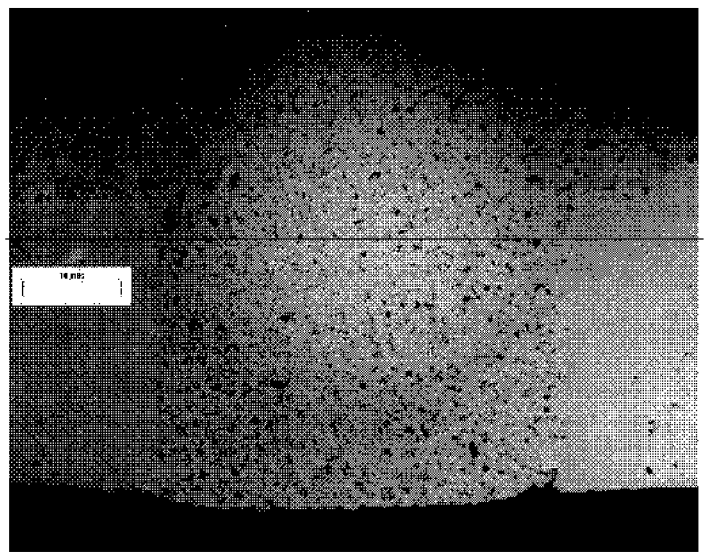
Figure 9:
Figure 9:

The first four of the above braze material compositions are preferably used as a mixture of particles of the alloys (as represented by FIG. 1), while the fifth braze material composition is preferably used in accordance with Budinger et al. (as represented by FIG. 2), whose disclosure regarding the compositions, preparation, and use of the braze materials disclosed therein are incorporated herein by reference. As such, in the preparation of a braze material containing the R195 high melting alloy and the D15M2 low melting alloy (hereinafter, R195+D15M2), the R80 high melting alloy and the D15M2 low melting alloy (hereinafter, R80+D15M2), the R80 high melting alloy and the D15M2 and GE81 low melting alloys (hereinafter, R80+D15M2+GE81), or the first R142 high melting alloy and the D15M2 and D15 low melting alloys (hereinafter, R142+D15M2+D15), powders of the alloys are mixed and combined with a suitable binder to form a slurry or paste that can be injected into, for example, a tip cap hole of a turbine blade. Heating these compositions to a braze temperature in the range of about 1177 to about 1232° C., more preferably about 1202 to about 1218° C., results in volatilization of the binder and complete melting of the lower melting alloy(s). Through the resulting capillary action, the molten low melting alloy(s) infiltrates and wets the still-solid particles of the high melting alloy, such that cooling to resolidify the low melting alloys results in bonding of the high melting alloy particles to each other and to the surfaces contacted by the particles.

In contrast, when using the last braze material of Table 4 containing the R142 high melting alloy and the D15M2 and D15 low melting alloys (hereinafter, R142+[D15M2+D15]), a powder of the R142 alloy is combined with a suitable binder to form a first slurry or paste that can be injected into, for example, a tip cap hole of a turbine blade, and powders of the low melting alloys are mixed and combined with a suitable binder (preferably though not necessarily the same as the binder for the R142 alloy powder) to form a second slurry or paste that can be applied over the first slurry/paste within the hole. Heating this composition to a braze temperature in the same range as stated above for the other braze materials of this invention results in volatilization of the binder(s) and complete melting of the lower melting alloy(s), which then flow via capillary action into the underlying and still-solid high melting alloy particles. Again, the molten low melting alloy(s) infiltrates and wets the particles of the high melting alloy, such that cooling causes the low melting alloys to solidify and bond the high melting alloy particles to each other and to surfaces contacted by the particles.

The powders of the high and low melting alloys preferably have particle sizes of not larger than 180 micrometers in diameter, preferably in the range of about 11 to about 45 micrometers in diameter, in order to promote handling and mixing characteristics and minimize void formation in the braze filling. Fine particle sizes also promote rapid melting of the low melting alloys. Suitable binders for use with all of the compositions set forth in Table 4 include, for example, a binder commercially available under the name NICROBRAZ-S from the Wall Colmonoy Corporation. Other potentially suitable binders include NICROBRAZ 320, VITTA GEL from Vitta Corporation, and others including adhesives commercially available from Cotronics Corporation, all of which preferably volatilize cleanly during brazing. The binder can be mixed with powders of the high and low melting alloys at a binder:powder ratio of about 1:5 to about 1:9 by weight, preferably about 1:7 by weight.

In comparison to the braze materials reported and disclosed in Budinger et., each of the above-noted braze material compositions of this invention have been shown to exhibit a significant improvement in oxidation resistance and a good balance in mechanical properties (including tensile, rupture, nil strength temperature). In an investigation leading to this invention, braze material compositions, including the five braze material compositions identified in Table 4, underwent a brazeability evaluation in which pastes of the candidate compositions were prepared by combining alloy powders (particle sizes of about 11 to about 45 micrometers) with a binder at a weight ratio of about 1:7. The pastes were deposited in tip cap holes having diameters of about 0.030 to 0.040 inch (about 0.76 to 1.02 mm), and then subjected to a temperature of about 1210° C. for about 10 minutes. The five braze material compositions set forth in Table 4 were prepared in accordance with the invention, i.e., premixing the high and low melting alloy powders of the R195+D15M2, R80+D15M2, R80+D15M2+GE81, and R142+D15M2+D15 compositions of Table 4, and premixing only the low melting alloy powders followed by separate injection of the high and low melting alloy powders for the R142+[D15M2+D15] composition of Table 4. Each of the five pastes formulated in accordance with the present invention yielded a brazement having less than 2% porosity and that filled 90 volume percent or more of the hole depth. Representative photomicrographs of each of the resulting brazements are shown in FIGS. 5-9. In addition to low porosity, the brazements formed by the braze material compositions of this invention exhibited desirable phase distributions. In particular, the brazements contained no or otherwise acceptably low levels of silicides that are detrimental to the mechanical properties, while exhibiting desirable levels of carbides that improve the creep and tensile behavior.

Several braze material compositions were then prepared to undergo oxidation resistance testing through furnace cycle testing (FCT). Tests were performed using 1.25×0.75×0.125 inch (about 32×19×3.2 mm) specimens formed of René N5 and René 142 superalloys, in which slots with widths of 0.35 inch (about 0.89 mm) were machined through the thickness of the specimen. Braze materials were injected into the slots to completely fill the slots, after which the specimens were run through the following braze and heat treatment cycle for a high pressure turbine blade: about 2210° F. (about 1210° C.) for about ten minutes (braze cycle), about 2050° F. (about 1120° C.) for about four hours (primary age cycle), about 1975° F. (about 1080° C.) for four about four to six hours (simulated aluminide coating cycle), and then about 1650° F. (about 900° C.) for about four hours (final age cycle). The FCT involved rapidly heating the specimens to about 2000° F. (about 1090° C.) for forty-five minutes, then fan air cooling to room temperature for fifteen minutes (one-hour cycles). At two hundred and four hundred completed cycles, specimens were removed from the test and evaluated metallographically for oxidation behavior in terms of erosion from material loss through oxidation and depth of oxidation of the remaining material.

Figure 10:
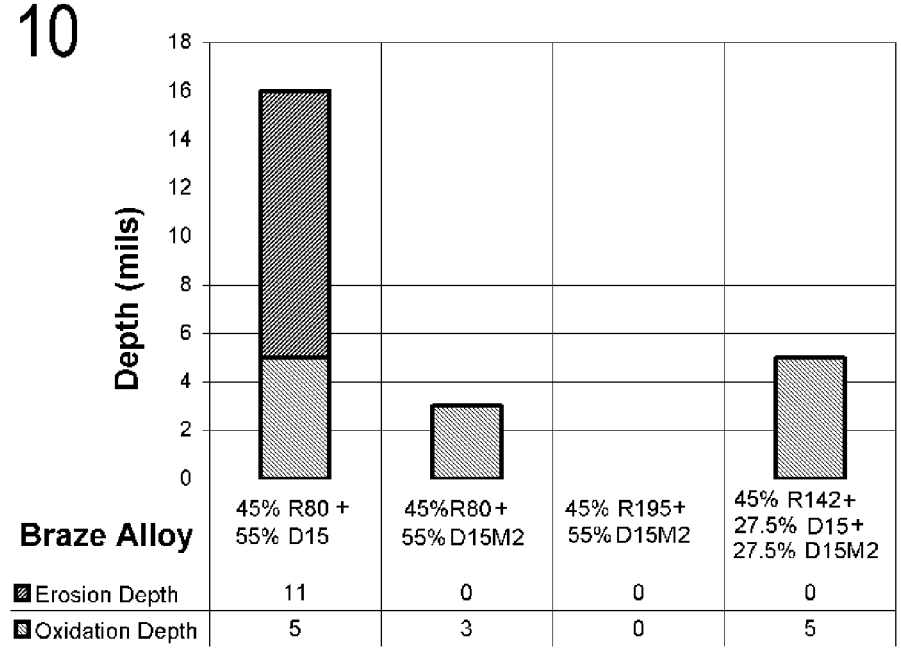
FIGS. 10 and 11 are graphs comparing the oxidation resistance of a filling formed with a prior art braze material to fillings formed with braze materials of the present invention.
Figure 11:
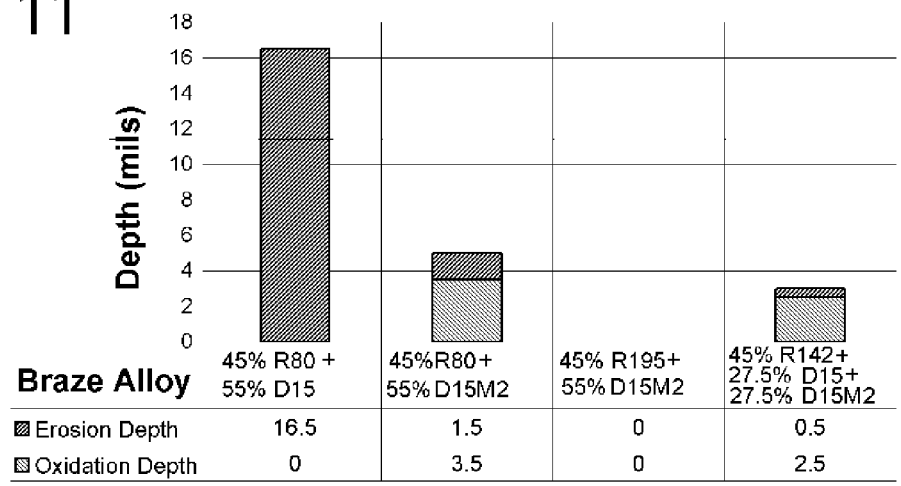

The results for brazements formed with four braze material compositions are shown in FIGS. 10 and 11. The material identified as 45% R80+55% D15 is the material reported in Budinger et al. as the prior art braze material, and was used as a baseline for evaluating the other compositions. The remaining braze materials evaluated are the R80+D15M2, R195+D15M2, and R142+D15M2+D15 compositions of Table 4. As evident from FIGS. 10 and 11, each of the tested braze material compositions of this invention showed a marked improvement over the baseline 45% R80+55% D15 material. Specifically, the compositions of this invention exhibited far less total loss in thickness due to oxidation, both in terms of erosion depth (reduction in thickness due to oxidation) and oxidation depth (depth of subsurface oxidation). Based on these results and the fact that the untested compositions of this invention contain similar amounts of silicon for oxidation resistance, it was concluded that all of the braze material compositions of this invention would exhibit much better oxidation resistance than the baseline 45% R80+55% D15 material.

While the invention has been described in terms of a preferred embodiment, it is apparent that other forms could be adopted by one skilled in the art. Therefore, the scope of the invention is to be limited only by the following claims.

What is claimed is:

1. A nickel-base braze material comprising first and second filler materials in at least one binder, the first filler material consisting of particles of a first alloy, the second filler material consisting of particles of a second alloy and optionally particles of a third alloy wherein the second alloy and the third alloy have lower melting temperatures than the first alloy, the second alloy consisting of, by weight, about 8 to about 23 percent chromium, about 4 to about 18 percent cobalt, about 1.5 to about 6.0 percent tantalum, about 1.0 to about 6.0 percent aluminum, about 0.3 to about 1.5 percent boron, about 2.0 to about 6.0 percent silicon, up to 0.2 percent carbon, the balance being nickel and incidental impurities.

2. The nickel-base braze material according to claim 1, wherein the second alloy consists of, by weight, about 14.8 to about 15.8 percent chromium, about 9.5 to about 11 percent cobalt, about 3.0 to about 3.8 percent tantalum, about 3.2 to about 3.7 percent aluminum, about 0.8 to about 1.2 percent boron, about 3.5 to about 4.1 percent silicon, up to 0.05 percent carbon, the balance being nickel and incidental impurities.

3. The nickel-base braze material according to claim 1, wherein the first and second filler materials are mixed together in the at least one binder at a weight ratio of about 60:40 to about 30:70, the second filler material consists of the particles of the second alloy, and the first alloy consists of, by weight, about 7.4 to about 7.8 percent chromium, about 5.3 to about 5.6 percent tantalum, about 2.9 to about 3.3 percent cobalt, about 7.6 to about 8.0 percent aluminum, about 0.12 to about 0.18 percent hafnium, about 0.5 to about 0.6 percent silicon, about 3.7 to about 4.0 percent tungsten, about 1.5 to about 1.8 percent rhenium, about 0.01 to about 0.03 percent carbon, about 0.01 to about 0.02 percent boron, balance nickel and incidental impurities.

4. The nickel-base braze material according to claim 3, wherein the first and second filler materials are mixed together at a weight ratio of about 45:55.

5. The nickel-base braze material according to claim 1, wherein the first and second filler materials are mixed together in the at least one binder at a weight ratio of about 55:45 to about 25:75, the second filler material consists of the particles of the second alloy. and the first alloy consists of, by weight, about 0.15 to about 0.19 percent carbon, about 13.7 to about 14.3 percent chromium, about 9.0 to about 10.0 percent cobalt, about 4.8 to about 5.2 percent titanium, about 2.8 to about 3.2 percent aluminum, about 3.7 to about 4.3 percent tungsten, about 3.7 to about 4.3 percent molybdenum (7.7 percent minimum tungsten+molybdenum), the balance nickel and incidental impurities.

6. The nickel-base braze material according to claim 5, wherein the first and second filler materials are mixed together at a weight ratio of about 40:60.

7. The nickel-base braze material according to claim 1, wherein the first and second filler materials are mixed together in the at least one binder at a weight ratio of about 60:40 to about 30:70, the first alloy consists of, by weight, about 0.15 to about 0.19 percent carbon, about 13.7 to about 14.3 percent chromium, about 9.0 to about 10.0 percent cobalt, about 4.8 to about 5.2 percent titanium, about 2.8 to about 3.2 percent aluminum, about 3.7 to about 4.3 percent tungsten, about 3.7 to about 4.3 percent molybdenum (7.7 percent minimum tungsten+molybdenum), the balance nickel and incidental impurities, the second filler material consists of the particles of the second and third alloys at a weight ratio of about 3:1 to about 1:2, and the third alloy consists of, by weight, about 18.5 to about 19.5 percent chromium, up to 0.01 percent carbon, up to about 0.03 percent boron, about 9.8 to about 10.3 percent silicon, the balance being nickel and incidental impurities.

8. The nickel-base braze material according to claim 7, wherein the first, second, and third alloys are combined in the braze material at a weight ratio of about 45:27.5:27.5.

9. The nickel-base braze material according to claim 7, wherein the second and third alloys are combined in the second filler material at a weight ratio of about 1:1.

10. The nickel-base braze material according to claim 7, wherein the first and second filler materials are mixed together at a weight ratio of about 45:55.

11. The nickel-base braze material according to claim 1, wherein the first and second filler materials are mixed together in the at least one binder at a weight ratio of about 60:40 to about 30:70, the first alloy consists of, by weight, about 11.45 to about 12.05 percent cobalt, 6.6 to about 7.0 percent chromium, 5.94 to about 6.3 percent aluminum, 1.3 to about 1.7 percent molybdenum, 4.7 to about 5.0 percent tungsten, 6.2 to about 6.5 percent tantalum, 2.6 to about 3.0 percent rhenium, 1.3 to about 1.7 percent hafnium, 0.10 to about 0.14 percent carbon, up to 0.02 percent titanium, the balance nickel and incidental impurities, the second filler material consists of the particles of the second and third alloys at a weight ratio of about 4:1 to about 1:1, and the third alloy consists of, by weight, about 14.8 to about 15.8 percent chromium, about 9.5 to about 11 percent cobalt, about 3.0 to about 3.8 percent tantalum, about 3.2 to about 3.7 percent aluminum, about 2.1 to about 2.5 percent boron, up to 0.05 percent carbon, the balance being nickel and incidental impurities.

12. The nickel-base braze material according to claim 11, wherein the first, second, and third alloys are combined in the braze material at a weight ratio of about 45:36.7:18.3.

13. The nickel-base braze material according to claim 11, wherein the second and third alloys are combined in the second filler material at a weight ratio of about 2:1.

14. The nickel-base braze material according to claim 11, wherein the first and second filler materials are mixed together at a weight ratio of about 45:55.

15. The nickel-base braze material according to claim 1, wherein the first and second filler materials are not mixed together but contact each other, the first and second filler materials are present in the braze material at a weight ratio of about 55:45 to about 15:85, the first alloy consists of, by weight, about 11.45 to about 12.05 percent cobalt, 6.6 to about 7.0 percent chromium, 5.94 to about 6.3 percent aluminum, 1.3 to about 1.7 percent molybdenum, 4.7 to about 5.0 percent tungsten, 6.2 to about 6.5 percent tantalum, 2.6 to about 3.0 percent rhenium, 1.3 to about 1.7 percent hafnium, 0.10 to about 0.14 percent carbon, up to 0.02 percent titanium, the balance nickel and incidental impurities, the second filler material consists of the particles of the second and third alloys at a weight ratio of about 4:1 to about 1:1, and the third alloy consists of, by weight, about 14.8 to about 15.8 percent chromium, about 9.5 to about 11 percent cobalt, about 3.0 to about 3.8 percent tantalum, about 3.2 to about 3.7 percent aluminum, about 2.1 to about 2.5 percent boron, up to 0.05 percent carbon, the balance being nickel and incidental impurities.

16. The nickel-base braze material according to claim 15, wherein the first, second, and third alloys are combined in the braze material at a weight ratio of about 40:40:20.

17. The nickel-base braze material according to claim 15, wherein the second and third alloys are combined in the second filler material at a weight ratio of about 2:1.

18. The nickel-base braze material according to claim 15, wherein the first and second filler materials are present in the braze material at a weight ratio of about 40:60.

19. The nickel-base braze material according to claim 15, wherein the first filler material fills a tip cap hole in a turbine blade and the second filler material overlies the first filler material and a surface region of the turbine blade surrounding the tip cap hole.

20. The nickel-base braze material according to claim 1, wherein the braze material fills a tip cap hole in a turbine blade.

* * * * *